(12) United States Patent
Aihara

(10) Patent No.: US 7,244,999 B2
(45) Date of Patent: Jul. 17, 2007

(54) CAPACITOR APPLICABLE TO A DEVICE REQUIRING LARGE CAPACITANCE

(75) Inventor: Masami Aihara, Campbell, CA (US)

(73) Assignee: Alps Electric Co., Ltd., Tokyo (JP)

( * ) Notice: Subject to any disclaimer, the term of this patent is extended or adjusted under 35 U.S.C. 154(b) by 32 days.

(21) Appl. No.: 11/173,971

(22) Filed: Jul. 1, 2005

(65) Prior Publication Data
US 2007/0001258 A1     Jan. 4, 2007

(51) Int. Cl.
*H01L 29/00* (2006.01)
(52) U.S. Cl. ............... 257/528; 257/306; 257/310; 257/532; 257/E23.144; 257/E29.343; 257/E29.345
(58) Field of Classification Search .......... 257/306, 257/310, 528, 532, 29.343, 29.345, 23.144
See application file for complete search history.

(56) References Cited

U.S. PATENT DOCUMENTS

| | | | |
|---|---|---|---|
| 5,378,583 A | 1/1995 | Guckel et al. | |
| 5,398,863 A | 3/1995 | Grube et al. | |
| 5,615,824 A | 4/1997 | Fjelstad et al. | |
| 5,796,572 A * | 8/1998 | Kawai | ........................ 361/313 |
| 6,759,261 B2 | 7/2004 | Shimokohbe et al. | |
| 6,856,225 B1 | 2/2005 | Chua et al. | |
| 2005/0219802 A1* | 10/2005 | Kobayashi et al. | ......... 361/523 |
| 2006/0022304 A1* | 2/2006 | Rzeznik | ...................... 257/532 |
| 2006/0133011 A1* | 6/2006 | Cox | ........................... 361/311 |

FOREIGN PATENT DOCUMENTS

JP          3099066         8/2000

* cited by examiner

*Primary Examiner*—Kenneth Parker
*Assistant Examiner*—Matthew E. Warren
(74) *Attorney, Agent, or Firm*—Brinks Hofer Gilson & Lione

(57) ABSTRACT

A capacitor includes a first electrode and a second electrode arranged so that a main surface of the first electrode opposes a main surface of the second electrode, a first pseudo electrode layer disposed on the main surface of the first electrode, and a dielectric layer disposed between the first pseudo electrode layer and the main surface of the second electrode. The first pseudo electrode layer includes conductive particles electrically coupled to the first electrode.

6 Claims, 3 Drawing Sheets

CAPACITOR APPLICABLE TO A DEVICE REQUIRING LARGE CAPACITANCE

BACKGROUND OF THE INVENTION

1. Field of the Invention

The present invention generally relates to capacitors and particularly to a capacitor applicable to a device requiring particularly large capacitance.

2. Description of the Related Art

Attempts have been made to increase the capacitance of a capacitor having a dielectric layer interposed between a pair of electrodes. There are several techniques for increasing the capacitance of the capacitor: by increasing the dielectric constant of the dielectric material constituting the dielectric layers, by decreasing the interelectrode distance, and/or by increasing the electrode areas. One of such attempts is a capacitor including a dielectric layer composed of a dielectric material, such as a polymeric material, and conductive or ceramic fine particles having a diameter less than 1 μm dispersed in the dielectric material (refer to U.S. Pat. No. 6,544,651 and US Patent Application No. 20030006402). An example of this capacitor is shown in FIG. 6. As shown in FIG. 6, this capacitor is mainly constituted from a pair of electrodes 21 and 22 opposing each other and a dielectric layer 23 interposed between the electrodes 21 and 22. Conductive or ceramic fine particles 24 are dispersed in the dielectric layer 23. If these fine particles 24 are metal fine particles, then the thickness of the dielectric layer 23 is practically decreased, and the apparent dielectric constant determined from the observed capacitance of this capacitor becomes larger than the inherent dielectric constant of the dielectric material constituting the dielectric layer 23. When the fine particles 24 are ceramic particles, it has been reported that the dielectric constant of such a dielectric layer 23 comes between the dielectric constant of the dielectric layer 23 without any dispersed ceramic and the dielectric constant of the ceramic dispersed. Thus, the capacitance of the capacitor can be increased by dispersing fine particles in the dielectric layer 23. This apparent dielectric constant is also known as "effective dielectric constant".

However, recent trends of faster digital circuits require capacitors to have ever larger capacitance. In the above-described capacitor, a larger amount of metal fine particles may be added to the dielectric layer to further increase the effective dielectric constant and to achieve higher capacitance. However, as shown in FIG. 7, this causes the dielectric layer to enter a so-called percolation region in the insulator-conductor transition. In this percolation region, as shown in FIG. 7, the change in dielectric constant shows a steep profile, and it is thus difficult to stably obtain a desired effective dielectric constant. Thus, a capacitor including a large amount of fine particles in the dielectric layer has a problem of low reliability. The problem of percolation does not occur when the dispersed particles are dielectric particles, such as ceramic fine particles; however, the upper limit of the dielectric constant is limited by the dielectric constant of the ceramic fine particles dispersed. This makes it difficult to fabricate a capacitor with large capacitance.

SUMMARY OF THE INVENTION

The present invention is directed to providing a highly reliable capacitor that has relatively large capacitance.

A first aspect of the present invention provides a capacitor including a first electrode and a second electrode arranged so that a main surface of the first electrode opposes a main surface of the second electrode, a first pseudo electrode layer disposed on the main surface of the first electrode, and a dielectric layer disposed between the first pseudo electrode layer and the main surface of the second electrode. Here, the first pseudo electrode layer includes conductive particles electrically coupled to the first electrode.

With this structure, the surface area of the pseudo electrode layer increases since the conductive particles are contained in the pseudo electrode layer. Thus, the integrated electrode area of the pseudo electrode layer and the electrode is increased, thereby increasing the capacitance of the capacitor as a whole. Moreover, since the dielectric layer containing metal fine particles do not undergo percolation, as described in FIG. 7, high reliability can be achieved.

Preferably, the capacitor further includes a second pseudo electrode layer on the main surface of the second electrode, the second pseudo electrode layer including conductive particles electrically coupled to the second electrode.

Preferably, the dielectric layer of the capacitor contains the conductive particles or ceramic particles. The effective thickness of the dielectric layer can be decreased, and the apparent dielectric constant can be increased when the dielectric layer contains the conductive particles. The substantial dielectric constant of the dielectric component can be increased when the dielectric layer contains the ceramic particles. As a result, the capacitance of the capacitor can be increased.

More preferably, the dielectric layer contains insulating particles to increase the resistance to moisture absorption and thereby prevent degradation of characteristics due to moisture absorption.

Preferably, the first pseudo electrode layer is composed of a material having a dielectric constant equal to or larger than a dielectric constant of a material constituting the dielectric layer. In this manner, serial connection between the dielectric material of the dielectric layer and the dielectric material of the pseudo electrode layer can be prevented, and a decrease in capacitance can be avoided.

DESCRIPTION OF THE PREFERRED EMBODIMENTS

The preferred embodiments of the present invention will now be described in detail with reference to the attached drawings.

First Embodiment

Figure 1:
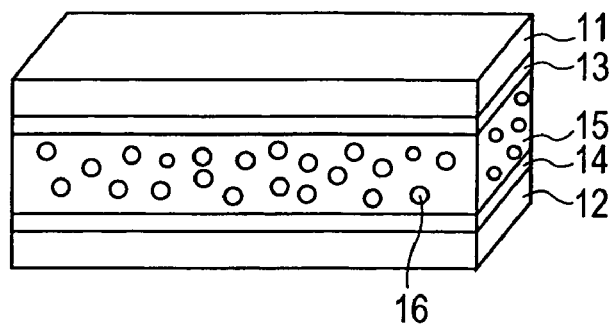
FIG. 1 shows a capacitor according to a first embodiment of the present invention.

FIG. 1 shows a first embodiment of a capacitor of the present invention. The capacitor includes a pair of electrodes 11 and 12 having main surfaces opposing each other, pseudo electrode layers 13 and 14 disposed on the main surfaces of the electrodes 11 and 12, and a dielectric layer 15 interposed between the pseudo electrode layers 13 and 14. In this embodiment, both the electrodes 11 and 12 are provided with the pseudo electrode layers. Alternatively, a pseudo electrode layer may be provided to only one of the electrodes 11 and 12.

Figure 2:
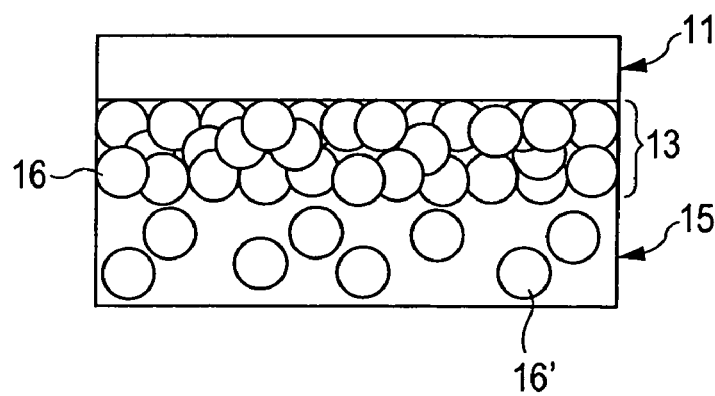
FIG. 2 is a partial enlarged view of the capacitor shown in FIG. 1.

The electrodes 11 and 12 may be conventional electrodes for capacitor applications. The pseudo electrode layers 13 and 14 are arranged as shown in FIG. 2. The pseudo electrode layers 13 and 14 (only the pseudo electrode layer 13 is shown in FIG. 2) contain conductive particles 16 that electrically couple with the electrodes 11 and 12 (only the electrode 11 is shown in FIG. 2). In this pseudo electrode layer 13, the conductive particles 16 are aggregated and electrically coupled to the electrode 11. Thus, the electrode 11 and the pseudo electrode layer 13 function as one electrode as a whole. Moreover, since the pseudo electrode layer 13 is constituted from many conductive particles 16, the electrode area of the pseudo electrode layer 13 can be significantly increased. Thus, the area of the electrode as a whole can be increased, and the capacitance of the capacitor can be increased thereby. The pseudo electrode layer 14 and the electrode 12 have the same structure as those shown in FIG. 2, although FIG. 2 illustrates the pseudo electrode layer 13 and the electrode 11 only.

The conductive particles 16 in the pseudo electrode layer 13 may be any conductive particles. Examples thereof include conductive metal particles, such as gold, silver, copper, and aluminum particles and ceramic particles such as carbon particles (e.g., carbon black and carbon nanotubes). The conductive particles 16 may be spherical, fibrous, or the like in shape. The average particle diameter of the conductive particles 16 is preferably about 1.0 µm or less and more preferably about 0.1 µm or less, considering the thickness of the capacitor as a whole. The conductive particles 16 are most preferably nanoparticles. Although the pseudo electrode layer 13 of this embodiment contains aggregated conductive particles 16, the pseudo electrode layer 13 may be a single layer composed of conductive particles electrically coupled to the electrode 11. In this case, the conductive particles are preferably distant from one another to increase the surface area.

Figure 7:
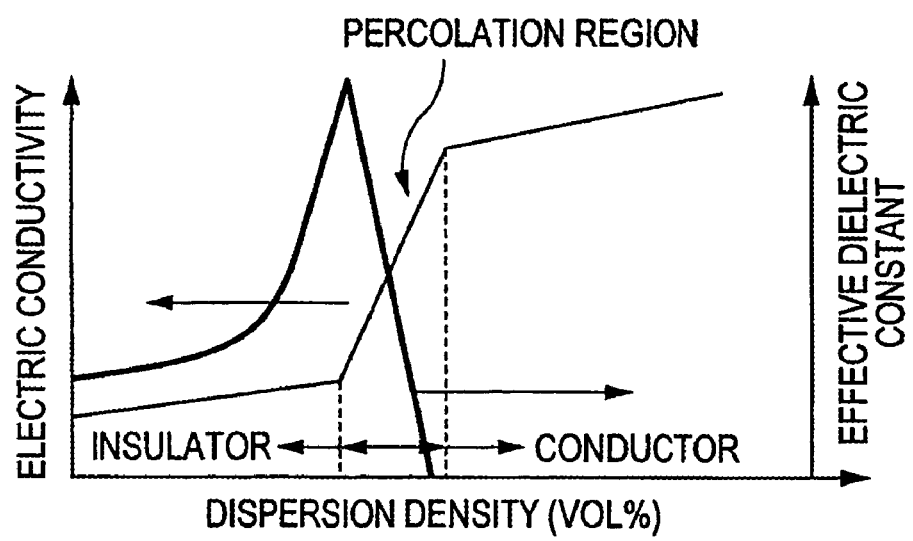
FIG. 7 shows electric conductivity and effective dielectric constant plotted against dispersion density of fine particles.

The dispersion density (content) of the conductive particles 16 in the pseudo electrode layers 13 and 14 is preferably sufficiently large to allow the layer to reach the conductor region from the percolation region show in FIG. 7. By dispersing the conductive particles 16 in such an amount, the pseudo electrode layer 13 in combination with the electrode 11, and the pseudo electrode layer 14 in combination with the electrode 12 can efficiently function as electrodes. For example, the content of the conductive particles 16 in the pseudo electrode layers 13 and 14 is preferably 30 to 80 vol % from the standpoint of increasing the surface area. The thickness of the pseudo electrode layers 13 and 14 is preferably 0.1 to 10 µm considering the thickness of the capacitor as a whole.

The dielectric material constituting the dielectric layer 15 may be a polymeric material such as an epoxy resin, a polyimide resin, or a silicone resin. The thickness of the dielectric layer 15 is preferably 0.1 to 100 µm considering the capacitance of the capacitor and the production process. The dielectric layer 15 preferably contains particles 16', which are conductive particles such as metal particles or insulating particles such as ceramic particles. When the particles 16' are metal particles, the effective thickness of the dielectric layer 15 is decreased, and the apparent dielectric constant can be increased. When the particles 16' are ceramic particles, the dielectric constant of the dielectric layer 15 can be increased and thus the capacitance of the capacitor can be increased. The dispersion density of the conductive layers 16' in the dielectric layer 15 is preferably at a level that does not reach the conductor region from the percolation region shown in FIG. 7. The dispersion density is preferably 1.0 to 20 vol %. The conductive or insulating particles 16' are most preferably nanoparticles.

If it is difficult to form the pseudo electrode layer 13 or 14 with only the conductive particles 16, a binder may be used to form a layer of the conductive particles 16. Here, the material, such as a binder, to be contained in the electrode layer 13 or 14 is preferably a material having a dielectric constant equal to or larger than the dielectric constant of the dielectric material constituting the dielectric layer 15. In this manner, serial connection between the dielectric material of the dielectric layer 15 and the dielectric material of each of the pseudo electrode layers 13 and 14 can be prevented, and a decrease in capacitance can be avoided. Note that, although the pseudo electrode layers 13 and 14 are formed as separate layers from the dielectric layer 15, these layers may be formed as one layer that includes pseudo electrode regions and a dielectric region.

The capacitor of this embodiment has pseudo electrode layers containing conductive particles, as described above. Thus, the pseudo electrode layers have large surface areas. In other words, the area of the electrode can be increased since the electrode and the pseudo electrode integrally form one electrode. Thus, the capacitance of the capacitor can be increased. Moreover, if metal particles are dispersed in the dielectric layer, the layer does not reach the percolation region shown in FIG. 7. Thus, high reliability can be ensured.

Figure 4A:
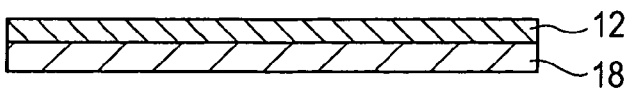
FIGS. 4A to 4F are cross-sectional views for explaining the process for making the capacitor shown in FIG. 1.
Figure 4B:
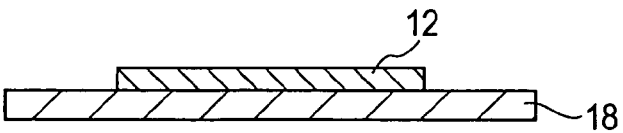

Next, a process for making a capacitor having the above-described features will be explained. FIGS. 4A to 4F are cross-sectional views for explaining the steps of making the capacitor shown in FIG. 1. Referring first to FIG. 4A, an electrode material is deposited onto a base 18 to form the electrode 12, i.e., a lower electrode. The electrode 12 is then subjected to patterning, as shown in FIG. 4B. The patterning is conducted by forming a resist layer on the electrode 12, exposing and developing the resist layer through a mask for patterning the electrode 12, etching the electrode 12 through the remaining resist layer serving as a mask, and removing the resist layer. The material of the resist layer and the conditions of the exposure and development may be the same as conventional processes. The etchant and the etching conditions may be determined based on the electrode material.

Figure 4C:
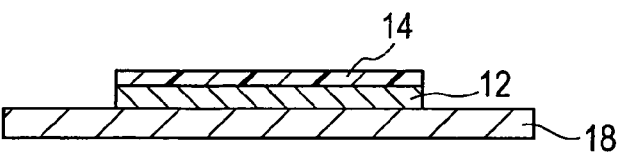

Next, as shown in FIG. 4C, a material for a pseudo electrode is applied onto the electrode 12 and baked to form the pseudo electrode layer 14. The material for the pseudo electrode may be applied by spin coating, for example. The material for the pseudo electrode is prepared by mixing and kneading the conductive particles 16 into a resin material, for example. To be more specific, the material for the pseudo electrode may be prepared by introducing a resin material and conductive particles into a juicer or a mixer, followed by mixing and kneading for about 12 hours to 2 days.

Figure 4D:
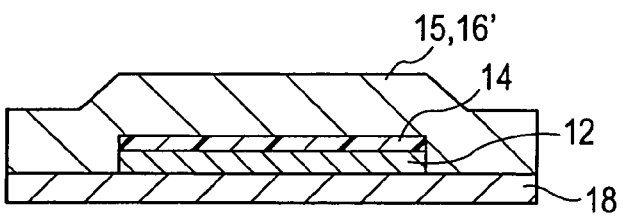

Referring now to FIG. 4D, a dielectric material is applied onto the base 18 on which the electrode 12 and the pseudo electrode layer 14 are formed, and baked to prepare the dielectric layer 15. The dielectric material may be applied by spin coating, for example. As with the material for the pseudo electrode, the dielectric material is prepared by mixing and kneading a resin material and conductive particles 16, for example.

Figure 4E:
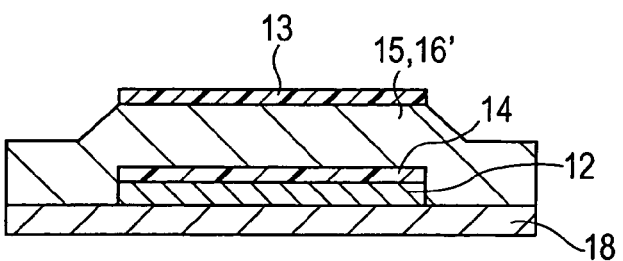

Next, the material for the pseudo electrode is applied on the dielectric layer 15, as shown in FIG. 4E, and baked to form the pseudo electrode layer 13. Here, a spin coating technique may be employed to apply the material for the pseudo electrode.

Figure 4F:
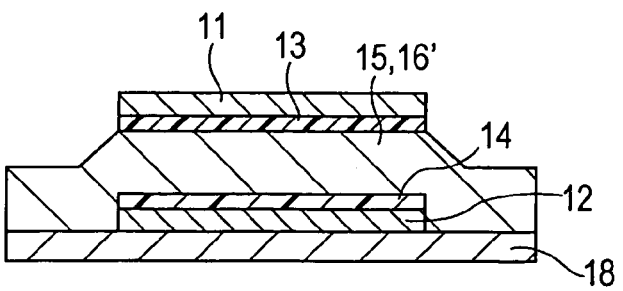

Finally, an electrode material is applied onto the pseudo electrode layer 13 to form the electrode 11, i.e., an upper electrode, as shown in FIG. 4F, and is subjected to patterning. The patterning is conducted by forming a resist layer on the electrode 11, exposing and developing the resist layer through a mask for patterning the electrode 11, etching the electrode 11 through the remaining resist layer functioning as a mask, and removing the resist layer. The material of the resist layer and the conditions of the exposure and development may be the same as conventional processes. The etchant and the etching conditions may be determined based on the electrode material.

EXAMPLES

Experiments described below were conducted to confirm the advantages of the present invention.

Figure 3:
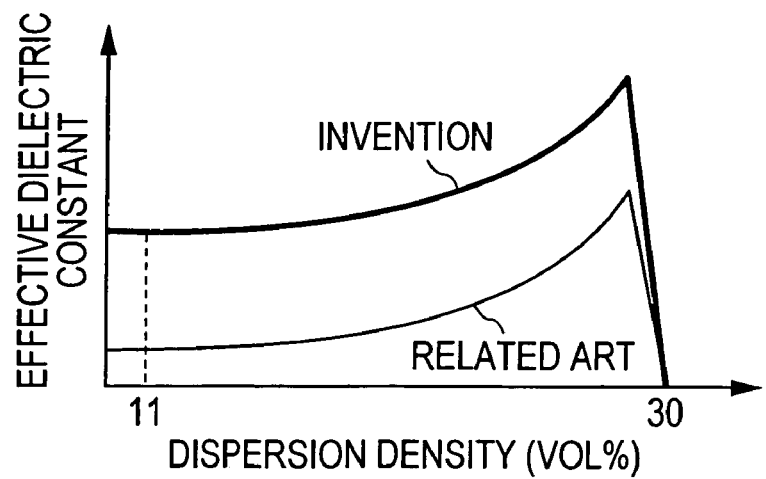
FIG. 3 is a graph showing a characteristic of a capacitor of the present invention.

A capacitor having electrodes 11 and 12 composed of aluminum, pseudo electrode layers 13 and 14 composed of an epoxy resin and silver particles (conductive particles 16) having an average particle diameter of about 0.1 μm (content: about 40 vol %), and a dielectric layer 15 composed of an epoxy resin and silver particles (conductive particles 16') having an average particle diameter of about 0.1 μm (content: about 11 vol %) was prepared by the process described above. The thickness of the dielectric layer 15 was 10 μm, and the electrode area was 100 μm×100 μm. The pseudo electrode layers 13 and 14 and the dielectric layer 15 were baked at about 150° C. for 5 minutes. The effective dielectric constant of this capacitor was measured and the result is shown in FIG. 3 (indicated by a broken line). The effective dielectric constant was determined by connecting an LCR meter to both terminals of the capacitor through probes, measuring the capacitance of the capacitor at measuring conditions of 1 Vp-p and 100 kHz, and then calculating the effective dielectric constant based on the thickness and the electrode area based on the equation $C = \in \cdot s/d$.

A number of capacitors were prepared by gradually increasing the amount of the silver particles in the dielectric layer 15, and the effective dielectric constant of these capacitors was measured as described above. The results are plotted as shown in FIG. 3 (invention). For the comparison purposes, capacitors having no pseudo electrode layers, i.e., capacitors constituted from electrodes and dielectric layers, were prepared by changing the amount of the silver particles in the dielectric layers. The effective dielectric constant of these capacitors was also measured as described above. The results are shown in FIG. 3 (related art).

As is apparent from FIG. 3, the capacitors of the present invention have higher effective dielectric constants than the capacitors of related art. This is presumably because of the increased electrode area due to the existence of the pseudo electrode layers 13 and 14. Note that zero effective dielectric constant was reported in the both capacitors of the invention and the related art having a silver particle content of 30 vol %. This is presumably because the dielectric layer functioned as a conductor due to the existence of the conductive particles.

Second Embodiment

Figure 5:
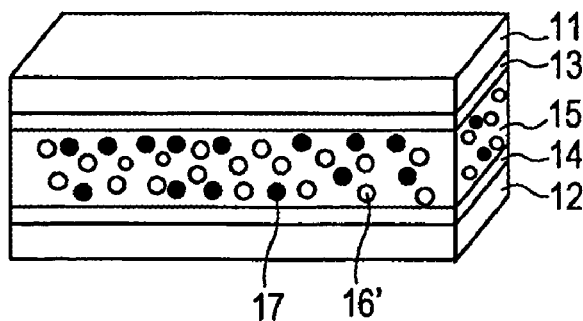
FIG. 5 shows a capacitor according to a second embodiment of the present invention.
Figure 6:
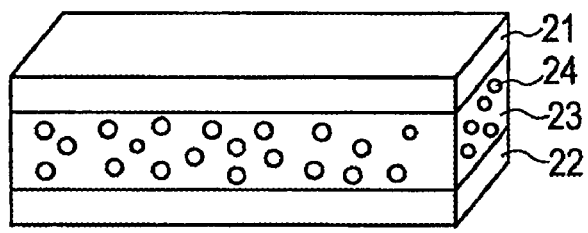
FIG. 6 shows a capacitor of a related art.

In this embodiment, insulating particles are contained in the dielectric layer. FIG. 5 shows a capacitor according to a second embodiment of the present invention. In FIG. 5, the same components as those shown in FIG. 1 were represented by the same reference numerals, and the detailed description of these identical components are omitted to avoid redundancy.

The capacitor shown in FIG. 5 includes a dielectric layer 15 containing both conductive particles 16 and insulating particles 17. In this manner, the resistance of the capacitor against moisture absorption can be increased, and degradation of characteristics due to moisture absorption can be prevented. For example, when the dielectric layer 15 is composed of a polymeric material, it is possible that the polymer absorbs moisture, thereby adversely affecting the characteristics. By dispersing the insulating particles 17 into the dielectric layer 15, the percentage of the polymer can be decreased as the polymer is replaced with the insulating particles 17. Accordingly, moisture absorption can be decreased while maintaining insulating properties. The insulating particles 17 are preferably composed of a material having a dielectric constant equal to or larger than the dielectric constant of the material constituting the dielectric layer 15. For example, a material having a dielectric constant of 4,000 to 5,000 is preferably used. In this manner, the dielectric constant of the dielectric components can be improved.

Examples of the insulating particles 17 include silica particles and alumina particles. The insulating particles 17 may be of a single type or a mixture of two or more types of insulating particles. The content of the insulating particles 17 in the dielectric layer 15 should be larger than the content of the conductive particles 16' when the conductive particles 16' are mixed. In this manner, the dielectric constant of the dielectric layer can be further increased. The content of the insulating particles 17 in the dielectric layer 15 is preferably 40 to 70 vol %, for example.

This capacitor can be made by the same process described above except for the process for making the dielectric material. The dielectric material is prepared by mixing and kneading the conductive particles 16 and the insulating particles 17 with a resin material, for example.

EXAMPLES

Experiments described below were conducted to confirm the advantages of the present invention.

A capacitor having electrodes 11 and 12 composed of aluminum, pseudo electrode layers 13 and 14 composed of a polyimide resin (dielectric constant: 3.5) and silver particles (conductive particles 16) having an average diameter of about 0.1 μm (content: about 40 vol %), and a dielectric layer 15 composed of a polyimide resin, silver particles (conductive particles 16') having an average particle diameter of about 0.1 μm (content: about 10 vol %) and alumina particles (insulating particles 17, dielectric constant: 9 to 10) having an average particle diameter of about 0.1 μm (content: about 40 vol %) was prepared as described above. The thickness of the dielectric layer 15 was 10 μm, and the electrode area was 100 μm×100 μm. The pseudo electrode layers 13 and 14 and the dielectric layer 15 were baked at about 150° C. for 10 minutes. The effective dielectric constant of this capacitor was determined by connecting an LCR meter to both ends of the capacitor through probes, measuring the capacitance of the capacitor under measuring conditions of 1 Vp-p and 100 kHz, and then calculating the effective dielectric constant based on the thickness and the electrode area based on the equation $C=\epsilon \cdot s/d$. The moisture absorption of this capacitor was then determined by measuring the weight change at 40° C. and 80% RH with a precision balance.

For comparison purposes, a capacitor of a related art having aluminum electrodes and a dielectric layer composed of a polyimide resin and 10 vol % of silver particles (conductive particles 16) having an average particle diameter of about 0.1 µm was prepared. The effective dielectric constant and the moisture absorption of this capacitor were measured as described above.

The capacitor of the present invention showed a higher effective dielectric constant than the related art capacitor, and exhibited a smaller change in weight due to moisture absorption. The increase in effective dielectric constant is presumably attributable to the increased electrode area by the existence of the pseudo electrode layers 13 and 14. The lower moisture absorption is presumably attributable to the decreased volume of the polymer portion by the increased volume of alumina particles in the dielectric layer.

The present invention is not limited by the first and second embodiments described above, and various modifications and alternations are possible. For example, although pseudo electrode layers are provided to both the upper and lower electrodes in these embodiments, an embodiment in which only one of the upper and lower electrodes is provided with a pseudo electrode layer is also in the scope of the present invention. Moreover, in the first and second embodiments above, conductive particles are dispersed in the dielectric layer. However, the present invention is applicable to capacitors having dielectric layers not containing dispersed conductive particles. Other alternations and modifications are possible without departing from the scope of the present invention.

The present invention is also applicable to interposers of ICs and embedded capacitors (decoupling capacitors).

What is claimed is:

1. A capacitor comprising:
    a first electrode and a second electrode arranged so that a main surface of the first electrode opposes a main surface of the second electrode;
    a first pseudo electrode layer disposed on the main surface of the first electrode; and
    a dielectric layer disposed between the first pseudo electrode layer and the main surface of the second electrode,
    wherein the first pseudo electrode layer includes conductive particles electrically coupled to the first electrode, and
    wherein the first pseudo electrode layer comprises a material having a dielectric constant equal to or larger than a dielectric constant of a material constituting the dielectric layer.

2. The capacitor according to claim 1, further comprising a second pseudo electrode layer on the main surface of the second electrode, wherein the second pseudo electrode layer includes conductive particles electrically coupled to the second electrode.

3. The capacitor according to claim 2, wherein the dielectric layer contains the conductive particles or ceramic particles.

4. The capacitor according to claim 1, wherein the dielectric layer contains insulating particles.

5. The capacitor according to claim 2, wherein the dielectric layer contains insulating particles.

6. The capacitor according to claim 3, wherein the dielectric layer contains insulating particles.

* * * * *